United States Patent
Jackson

[15] 3,644,819
[45] Feb. 22, 1972

[54] CONVERTER CIRCUIT FOR AC TO DC WITH FEEDBACK MEANS

[72] Inventor: Stuart P. Jackson, 1723 Grace Lane, Columbus, Ohio 43221

[22] Filed: July 14, 1969

[21] Appl. No.: 841,235

[52] U.S. Cl. ..............................321/20, 307/103, 307/151
[51] Int. Cl. .......................................................H02m 3/32
[58] Field of Search..................321/2, 16, 18, 20, 45 ER, 45; 307/103, 151, 71

[56] References Cited

UNITED STATES PATENTS

| | | |
|---|---|---|
| 3,270,269 | 8/1966 | Low....................................321/18 X |
| 3,388,311 | 6/1968 | Delalastra...................321/45 ER UX |
| 3,275,948 | 9/1966 | Rosenbusch..........................331/181 |
| 3,416,063 | 12/1968 | Guggi.........................................321/16 |

FOREIGN PATENTS OR APPLICATIONS

| | | |
|---|---|---|
| 800,122 | 11/1968 | Canada......................................321/2 |
| 1,304,263 | 8/1962 | France......................................321/45 |

*Primary Examiner*—William H. Beha, Jr.
*Attorney*—Stefan J. Klauber

[57] ABSTRACT

This invention relates to a circuit for converting direct current electric power into alternating current electric power. Specifically, the invention relates to a converter utilizing a combination of simple modulation by means of feedback to produce an output containing reduced voltage variation and maintaining commutating circuit capability.

7 Claims, 10 Drawing Figures

3,644,819

*INVENTOR.*
STUART P. JACKSON

BY

*ATTORNEY*

INVENTOR.
STUART P. JACKSON
BY
ATTORNEY

SWITCH OPEN

FROM PULSE FORMING CIRCUIT

FROM GATE SWITCH (CLOSED)

FROM TIME DELAY CIRCUIT

SWITCH CLOSED

*INVENTOR.*
STUART P. JACKSON
BY
ATTORNEY 3,644,819

CONVERTER CIRCUIT FOR AC TO DC WITH FEEDBACK MEANS

BACKGROUND

A converter is a device which changes a direct source to one having alternating polarity components. In many applications it is desirable that the output waveform be sinusoidal. For certain types of converters this is provided naturally; such as by the rotation of a coil of wire in a magnetic field as in a motor-alternator set.

There is a class of converters whose basic means of conversion is accomplished by a switching device. The type of switch used may be mechanical (knife switches, etc.), electromechanical (contactors, synchronous switches, etc.), airgap (vacuum tube, gaseous tube, arc, etc.), solid state (transistors, thyristors, etc.) or many others (light, heat, strain, liquid level, rate of change actuated, etc.)

All switching elements have in common, operation in two principle modes; i.e., "open" or "closed." The "open" condition is characterized by high impedance between its major terminals, its "closed" condition by low or negligible impedance between its major terminals. The operating characteristics of switches suggest two major applications: (1) to interrupt current flow and (2) to provide a path for current flow. Sequential or parallel operation of sets of switches not only interrupt current flow to several paths at the same time and provide several paths for current to flow at the same time, but can also serve to reverse polarity of a direct voltage source. With the addition of multiple sources of voltage, voltage level may also be changed by interrupting some current paths and providing for others between the various sources.

In that class of converters using switches as the major element, providing the desirable output waveform, i.e., sinusoidal, poses some difficulties. The operating characteristics of a switch suggest the basic output waveform of the converter is rectangular. Specifically, three basic output waveforms will appear: (1) a "square wave," one whose output polarity reverses twice per cycle, referred to as "simple" modulation, (2) one whose output polarity reverses more than twice per cycle, referred to as multiple pulse modulation, and (3) one whose output may be zero for some portion of the cycle as well as of two polarities, referred to as pulse width modulation.

In the design of a converter, it is desirable that the cost be low and with a reliability that is high, consistent with all other application requirements. This suggests that a minimum of major switching elements be used and that conservatively rated components and circuit redundancy be incorporated in the design. Also, it is desirable to maintain the output voltage of the converter within an allowable band of values. This is necessitated by the normal voltage drops within the converter. Voltage tolerance is aggravated by the voltage drops in the rectifier supplying power to the converter or by the battery voltage variation (2 volts/battery cell ±15 percent from equalize charge to discharge condition). In many applications, the output voltage must be held to some reference value within ±5 percent or ±10 percent to simulate normally available commercial power. It is obvious, as an example, that if a battery supply is used, the ±15 percent voltage variation from the battery reference value must be reduced if the converter is to supply an output voltage within ±10 percent of a reference value.

Thus there are two significant difficulties which must be solved in a satisfactory converter design for many applications. They are output filtering to produce a sinusoidal waveform and secondly to reduce the normal voltage variation to within acceptable tolerances.

SUMMARY

The present invention relates to a standby power supply converter circuit which operates with simple modulation of the source voltage, i.e., reversing polarity of the source only. A portion of the output alternating wave is rectified and then added to the input of the converter. This is done by a switching means actuated when the input source decreases to a preset value or when the output voltage reaches a preset value. This has the effect of increasing the necessary volt-ampere capacity of the converter and in maintaining the capability of the commutation circuit to turn the electronic switches off. The net effect of maintaining a lower input voltage variation is of greater advantage than the disadvantage of the converter's additional handling capacity and in certain instances harmonic reduction in the output waveform occurs.

OBJECTS

Accordingly it is a principal object of the present invention to provide an improved standby power supply.

Another object of the invention is to provide a standby power supply which operates by means of simple modulation of its power source.

Another object of the invention is to provide a standby power supply having a reduced output voltage variation.

Another object of the invention is to provide a standby power supply having reduced lower order harmonics.

A further object of the invention is to provide a standby power supply which utilizes a minimum of major switching elements and conservatively rated components.

Still a further object of the invention is to provide a standby power supply which combines high reliability and low cost.

BRIEF DESCRIPTION OF THE DRAWINGS

For a complete understanding of the invention, together with other objects and advantages thereof, reference may be made to the accompanying drawings, in which.

DETAILED DESCRIPTION OF THE DRAWINGS

In accordance with the general concepts of the embodiments shown in the figures, simple modulation suggests that the basic converter circuit has the capability of reversing polarity of the source only. The other alternative remaining is to take a portion of the output alternating wave, rectify it and add it to the input source. This is done by switching means, such as an electromechanical switch actuated when the input battery source decreases to a preset value or when the output voltage reaches some preset value.

Figure 1:
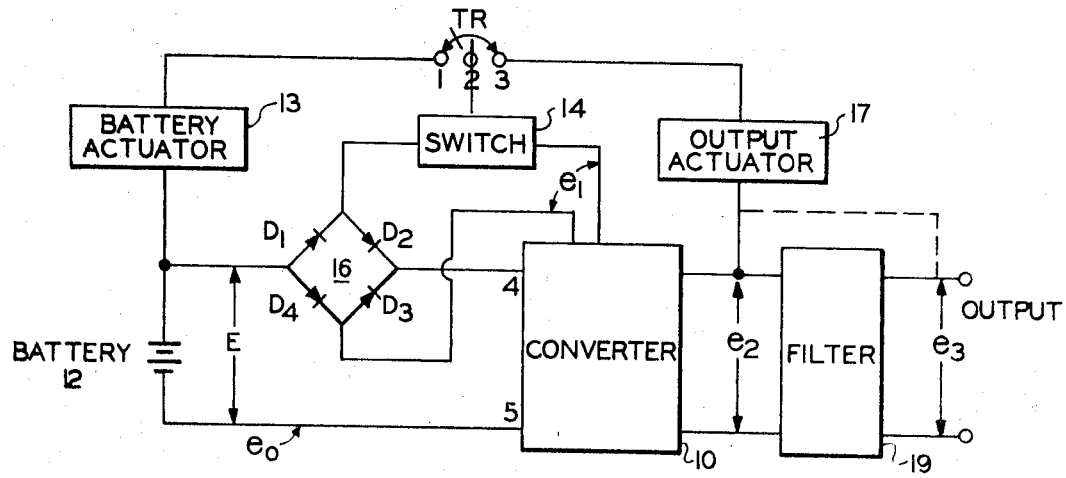
FIG. 1 is a diagrammatic illustration of the general form of the preferred embodiment of the invention.

Referring to FIG. 1, the converter 10 is supplied by a source of energy 12. For the purpose of illustrating the results achievable with the present invention under extremely poor conditions, a battery having a variation of ±15 percent from a reference value will be used as the source in the preferred embodiment of a circuit of the invention. This represents the very popular application for standby power supplies using batteries as standby sources.

The direct voltage is applied to converter 10 through the rectifier bridge 16 comprised of diodes D1, D2, D3 and D4. In operation with the switch 14 open, no alternating voltage, $e_1$, is fed to the rectifiers comprising the bridge 16. The direct voltage applied in this condition to the converter 10 terminals 4 and 5 is the source voltage E less the forward drops of D1 and D2 in parallel with D4 and D3. It is assumed for purposes of this description that such forward voltage drops are negligible.

With the switch 14 closed, then the voltage $e_1$ from the converter 10 is applied to the bridge 16. In this case the voltage at the input terminals 4 and 5 is $E+E_1$, where $E_1$ is the rectified average value of $e_1$, assuming again that the diode drops (D1, D2, D3, D4) are negligible.

The condition of the switch 14 is determined alternatively by the source potential E or the rectified value of $e_2$. When the source potential E determines the switch 14 condition, points 1 and 2 of TR are connected in common. When the rectified average value of the output $e_2$ determines the switch condition, points 2 and 3 of TR are connected in common.

It should be noted that $e_3$ could also serve as the sensed voltage. In this case, the output actuator 17 would be transferred to a point on the output side of the filter 19 as shown by the dotted lines.

The battery actuator 13 or the output actuator 17 may consist of a relay whose coil is sensitive to a voltage signal causing it to change state at a predetermined voltage. This predetermined voltage will be lower than the nominal value since it is the act of the actuator which causes an increase in the converter input voltage at its terminals 4 and 5.

A more complicated actuator may use a reference potential source and a polarized amplifier. When this sensed voltage reaches a preset lower value the reference potential could be made to be greater than the sensed potential. The difference could be used directly or after amplification to actuate the switch 14.

Figure 2:
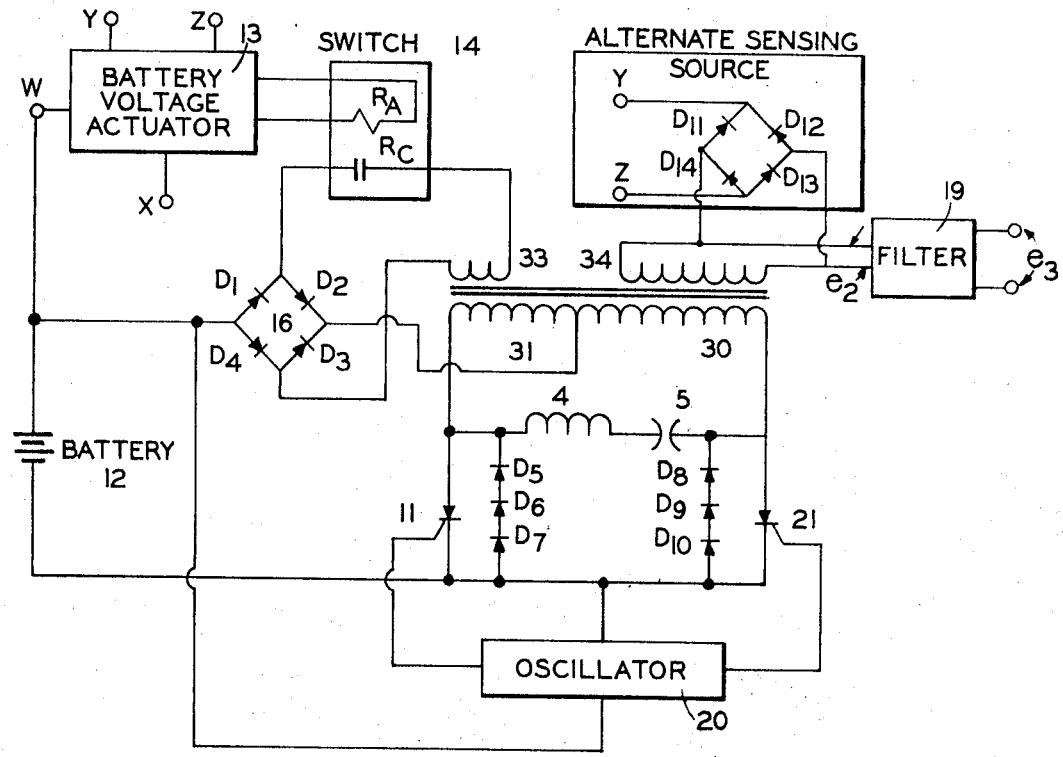
FIG. 2 is a diagrammatic illustration of a specific form of the preferred embodiment.

A specific and practical embodiment of the invention is shown in FIG. 2. The converter illustrated in this case comprises thyristors 11 and 21, diodes, D5, D6, D7, D8, D9, D10, transformer 30 with a tapped primary and commutating elements inductance 4 and capacitance 5 to provide turn off potential for thyristors 11 and 21. This circuit is similar to that disclosed by B. D. Bedford in U.S. Pat. No. 3,303,406. It is to be understood that other converter circuits could also be used with the present invention. An oscillator 20 is also shown to provide timed signals to the gates of the thyristors 11 and 21 with respect to their cathodes to cause the thyristors to conduct.

In operation with thyristor 11 conducting, a steady state has been reached, that is, current flows from the battery source 12 through winding 31, through both feedback winding 33 and secondary load winding 31, then thyristor 11 and to source 12. Capacitor 5 is charged to a potential equal to twice the voltage E if switch 14 is open (assuming diode forward drops of D1, D2, D3, D4 to be negligible). In this condition, oscillator 20 initiates a pulse of current to the gate of thyristor 22 causing it to conduct. A principal path of current flow now occurs through capacitor 5, thyristor 22, diodes D5, D6, D7 and inductance 4. The current flow provides reverse potential across thyristor 11 due to the forward voltage drops of diodes D5, D6, D7 for a sufficient period of time to cease conduction in thyristor 11. Another path exists for current to flow through capacitor 5, thyristor 22, switch 14, diodes D1, D2, D3, D4, and transformer 30. This current is accordingly coupled to the load winding 31 as well as the feedback winding 34. Normally the load impedances are sufficiently high to make the amount of energy consumed from the capacitor 5 small. The capability of the commutating elements inductance 4 and capacitance 5 to alternatively cause conduction in thyristors 1 and 2 is dependent on the energy stored in the capacitor 5 prior to commutation. This energy is equal to $\epsilon_c = \frac{1}{2}C(2E)^2 = 2CE^2$ for the situation of the switch 14 open.

In the event that it is desired that the output voltage be sensed, terminals X and Z of battery voltage actuator 13 are made common as shown. Diodes D11, D12, D13, and D14 then serve to rectify $e_2$. The source 12 connected at W and X serves as a supply for the reference circuit and is not a part of the sensed voltage.

Filter 19 serves to filter out the unwanted harmonics from the rectangular output wave. Assuming that the filter 19 is replaced by a resistive load, it is shown that an improvement occurs in the commutating circuit capability with the feedback connected switch 14 closed. First it should be noted that the Fourier expansion for a square wave is (assuming the transformer turns ratio is unity), $$e = \frac{4E}{\pi}\left[\sin \omega t + \frac{\sin \omega 3t}{3} + \frac{\sin \omega 5t}{5} + \ldots \right].$$

Thus, it is seen that the fundamental is proportional to the source potential $E$. Therefore, a reduction of $E$ to $aE$, where $a$ is less than 1.0 requires that the source current, $I_s$, increase to $Ei_s=(aE)(i_s/a)$. If, as an example, $a=0.8$, then $i_s$ is increased by $1/0.8=1.25=125$ percent of its value for $a=1.0$. This represents an additional current which must be commutated. However, when the current has increased by 25 percent due to this reduction in source potential, the energy available in the commutating capacity to do the job is
$$\epsilon = 2C(aE)^2 = 2C(0.8E)^2 = 2C(0.64)E^2 = 1.28CE^2.$$
Thus a reduction in energy of 36 percent has occurred.

Now close switch SW at an appropriate time to reduce the output voltage variation by a factor of 2 (which can be done with a single switch and single feedback voltage). Now the source must supply this additional current which is defined by $1/a=25$ percent. If $a=0.8$, the $i_s$ has increased to 125 percent of its previous (switch open) value.

Thus, the current is equal to that without feedback but the minimum energy in the commutating capacitor is $$\epsilon = 2C\left[\left(1-\frac{1-a}{2}\right)E\right]^2 = 2C\left[\left(\frac{1+a}{2}\right)E\right]^2$$

which for $a=0.8$ equals $1.62 CE^2$. Thus the energy has been reduced only 19 percent. The results of the two conditions of the examples are tabulated below:

|  | $E=0.8E$ SW OPEN | SW CLOSED | $E=E$ SW OPEN |
|---|---|---|---|
| $e_1$ | 0.8E | 0.9E | 1.0E |
| $i_s$ | 1.25 | 1.25 | 1.0 |
| $\epsilon$ | 1.28 | 1.62 | 2.0 |

Figure 3:
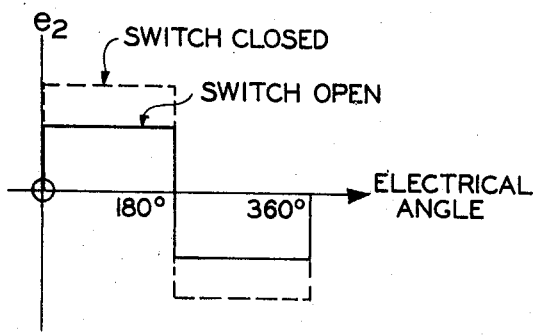
FIG. 3 is a graphical illustration of the output voltage waveform before the filter, with the feedback voltage not applied (switch open) and applied (switch closed)

FIG. 3 shows the normalized (transformer turns ratio equals unity) output voltage. The value of $E_1$ is selected to be essentially half the total natural variation of $E$.

Figure 4:
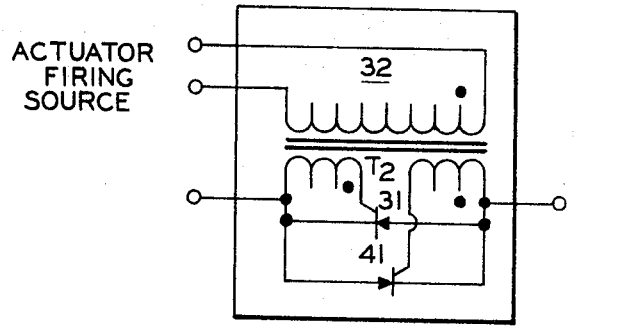
FIG. 4 is a diagrammatic illustration of a typical thyristor switch which may be used in the embodiments illustrated in FIGS. 1 and 2.

The substitution of thyristors as a means of switching as shown in FIG. 4 permits duplication of the action of the slower switches and to initiate the feedback potential at some electrical angle from zero to 180°. This angle $\alpha$ may be varied by a feedback loop to offer a smooth variation of output voltage or may be set at some fixed angle, $\alpha$ = constant, and switched on and off as before.

Figure 5:
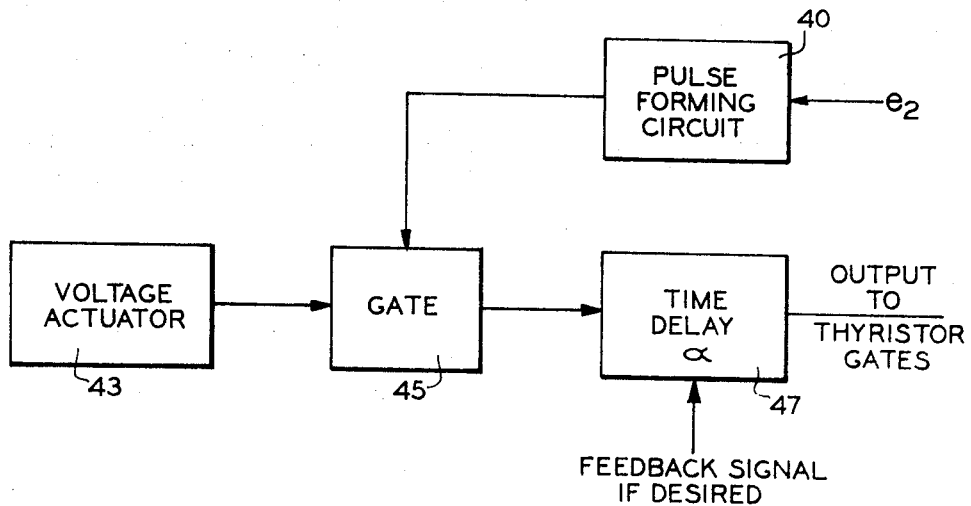
FIG. 5 is a diagrammatic illustration of a means of periodically applying the feedback voltage using the switch of FIG. 4 in the embodiments of FIGS. 1 or 2; and, FIGS. 6a through 6e are graphical illustrations of various circuit wave shapes which may exist using the periodic application of feedback voltage of FIG. 5 with the thyristor switch of FIG. 4 in the embodiments of FIGS. 1 and 2.
Figure 6A:
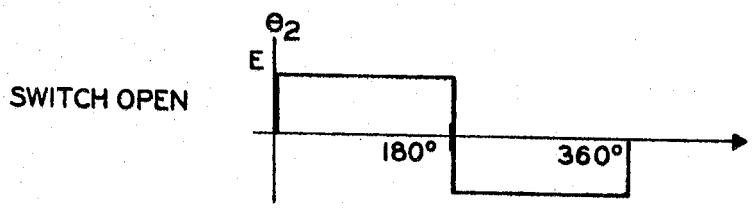
Figure 6B:
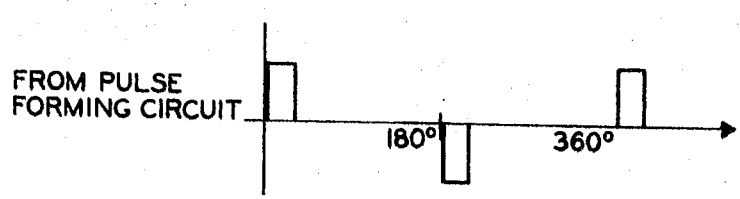
Figure 6C:
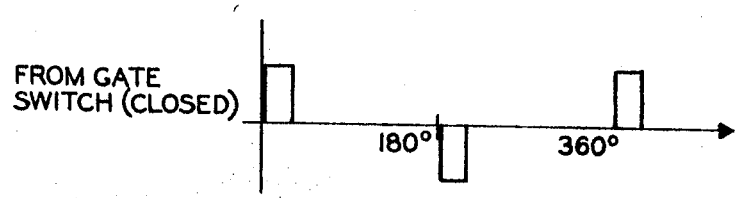
Figure 6D:
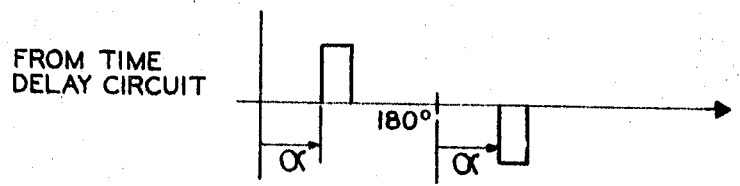
Figure 6E:
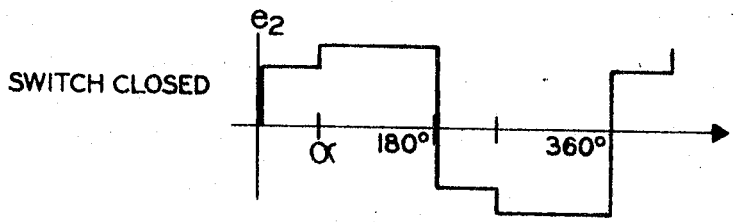

The diagram FIG. 5 is a general presentation of a circuit to provide a fixed $\alpha$ gated on when needed by the voltage actuator or a varying $\alpha$ by turning the actuator gate on at all times and using the feedback signal on the time delay module. Specifically, a pulse is formed in circuit 40 by the rapid rate of change of $e_2$ potential due to the change in polarity. The voltage actuator 43 by means of the gate 45, either rejects this pulse or allows it to pass to the time delay module 47. The output pulse serves to turn on the thyristor 31 and 41 gates by means of the pulse transformer 32 of FIG. 4. The waveforms for the circuits of FIGS. 1, 2, 4 and 5 are shown in FIGS. 6a through 6e. The waveform for $e_2$ in FIG. 6 shows that the voltage applied to the commutating capacitor 5 of FIG. 2 at the end of the half-cycle is $E+E_1$. Thus, the energy stored is at its maximum steady state value for the half-cycle.

The harmonic content of the output normalized waveform may now be analyzed by the Fourier technique since it is a periodic function which is finite everywhere and has a finite number of maxima and minima in one period. Thus $$e_n = \frac{2}{\pi}\int_0^\alpha E \sin n\theta d\theta + \frac{2}{\pi}\int_\alpha^\pi (E+E_1) \sin n\theta d\theta$$

or $$e_n = 2/\pi n[2E + E_1 E_1 \cos \alpha].$$

The two values for $n$ in which we have the greatest interest are $n=1$ since this is the output fundamental on which power rating is based and $n=3$ since this is the most difficult harmonic to filter. Thus we can derive the table of values shown below, where, $\alpha$ = angle of delay, $$e(1) = \text{fundamental} = \frac{4E}{\pi} \left[1 + \frac{E_1}{2E}(1 + \cos \alpha)\right]$$

and $$e(3) = \text{third harmonic} = \frac{4E}{3\pi} \left[1 + \frac{E_1}{2E}(1 + \cos 3\alpha)\right].$$

TABULATED VALUES

| $\alpha$ | $1 + \cos \alpha$ | $1 + \cos 3\alpha$ | $\frac{1 + \cos \alpha}{1 + \cos 3\alpha}$ |
|---|---|---|---|
| 0 | 2 | 2 | 1 |
| 30 | 1.866 | 1 | 1.866 |
| 45 | 1.707 | 0.293 | 5.82 |
| 60 | 1.5 | 0 | J |
| 90 | 1.0 | 1 | 1 |

It will be noticed that maximum benefit in the reduction of the third harmonic occurs for $\alpha=60°$. However, reduction occurs at all angles between 0° and 90° except 0° and 90°. Further variation in $\alpha$ is not particularly important due to the small change in $e(1)$, but for a smooth variation in output voltage obtained by varying $\alpha$ between 0° and 180° no abnormalities are noted.

Using the previous example and fixing $\alpha$ at the point where we achieve maximum increase in $e(1)$ relative to the maximum attenuation of $e(3)$, $\alpha=60°$, $$e(1) \mid \alpha = 60° = \frac{4E}{\pi}\left[1 + \frac{E_1}{2E}(1.5)\right]$$

$$= \frac{4E}{\pi}\left[1 + \frac{1E}{2E}(1.5)\right] = \frac{4E}{\pi} 1.075$$

$$e(3) \mid \alpha = 60° = \frac{4E}{3\pi}[1 + 0],$$

thus, the additional fundamental value of 7.5 percent has been achieved with no additional third harmonics. If the previous correction is desired of 10 percent $E$, $1 + pE/2E(1.5) = 0.1$, and $p = 0.2/1.5 = 0.133$ but in this case, of course, the energy stored in the commutating capacitor is higher.

Another advantage in making $\alpha > 0$, such that occurs after commutation, is that the voltage stress on the commutating capacitors is reduced. During commutation, the capacitor voltage may be in excess of twice the supply voltage. After commutation, this voltage reaches a steady state value of approximately twice the source potential. By applying $E_1$ after commutation the peak voltage across the capacitor is more nearly equal to $2(E+E_1)$.

In the example given it was shown that for a $0.1E$ feedback at $\alpha=60°$, the fundamental increased 7.5 percent. Note that the average input voltage increased 6.67 percent. Thus an improvement in the ratio between fundamental output voltage and average input voltage resulted.

It is not always necessary to make improvements by complication. Sometimes simple additions can offer advances in the art. Such is the case with simple modulation. Increased input voltage range capability, reduced commutating capacitor size, reduced commutating losses and, therefore, higher efficiency and, in some cases, harmonic reduction in the output are some of the advantages possible with this system. Reduced voltage starting and decreased input current are also possible if thyristors and feedback loop are employed.

Although certain and specific embodiments have been illustrated, it is to be understood that modifications may be made without departing from the true spirit and scope of the invention.

I claim:

1. A standby power supply system the improvement comprising:
   a source of direct voltage,
   a converter having the output terminals of said source connected thereto,
   means to rectify a portion of the output of said converter, and means to add said rectified portion in series to said source of direct voltage,
   means to control the application of said rectified output to the input of said converter, and
   said control means comprising a switching means and an actuating means,
   said switching means further comprising an electromechanical switch,
   wherein said actuating means is connected to and senses the power output of said converter, said actuating means having an electrical state related to a predetermined value of said power output.

2. A standby power supply system as set forth in claim 1 wherein said switching and actuating means comprises a voltage sensitive relay.

3. A standby power supply system as set forth in claim 1 wherein said system further comprises a filter circuit connected to the output terminals of said converter and wherein said actuating means is connected to and sensing the power output of said filter.

4. A standby power supply system as set forth in claim 1 wherein said switching means comprises a pulse transformer and two thyristors, said pulse transformer having two secondary coils, said secondary coils providing said thyristors' gates with sufficient voltage to actuate said thyristors thereby performing the switching function.

5. A standby power supply system as set forth in claim 4 wherein said actuating means comprises:
   a pulse forming circuit having connected thereto the power output of said inverter,
   a voltage actuator circuit,
   a gate circuit having the outputs of said pulse forming and said voltage actuator circuits connected thereto,
   a time delay circuit having the output of said gate circuit connected thereto, said time delay circuit's output connected to said switching means.

6. A standby power supply system as set forth in claim 5 wherein said actuating means further comprises a feedback signal connected to said time delay circuit to provide a smooth variation of said system's output voltage.

7. A standby power supply system as set forth in claim 2 wherein said actuating means is connected to and senses the output of said source of direct voltage, said actuating means having an electrical state related to a predetermined value of said direct voltage source's output.

\* \* \* \* \*